United States Patent
Yao

(10) Patent No.: US 10,797,891 B2
(45) Date of Patent: Oct. 6, 2020

(54) PHYSICALLY UNCLONABLE FUNCTION RESISTANT TO SIDE-CHANNEL ATTACK AND METHOD THEREFOR

(71) Applicant: NXP B.V., Eindhoven (NL)

(72) Inventor: Xiaoxu Yao, HongKou (CN)

(73) Assignee: NXP B.V., Eindhoven (NL)

( * ) Notice: Subject to any disclaimer, the term of this patent is extended or adjusted under 35 U.S.C. 154(b) by 282 days.

(21) Appl. No.: 15/955,089

(22) Filed: Apr. 17, 2018

(65) Prior Publication Data
US 2019/0305972 A1 Oct. 3, 2019

(30) Foreign Application Priority Data
Mar. 30, 2018 (CN) .......................... 2018 1 0304038

(51) Int. Cl.
| | | |
|---|---|---|
| H04L 9/32 | (2006.01) | |
| H04L 9/00 | (2006.01) | |
| H04L 9/08 | (2006.01) | |
| G06F 21/72 | (2013.01) | |

(52) U.S. Cl.
CPC ............ H04L 9/3278 (2013.01); H04L 9/002 (2013.01); H04L 9/0861 (2013.01); G06F 21/72 (2013.01); H04L 2209/12 (2013.01)

(58) Field of Classification Search
CPC ..... H04L 9/3278; H04L 9/0861; H04L 9/002; H04L 2209/12; H04L 9/003; H04L 9/3247; H04L 9/0866; H04L 9/3215; G06F 21/72; G06F 2221/2103
See application file for complete search history.

(56) References Cited

U.S. PATENT DOCUMENTS

| | | | |
|---|---|---|---|
| 2012/0179952 A1 | 7/2012 | Tuyls et al. | |
| 2016/0204781 A1* | 7/2016 | Plusquellic | H04L 9/0662 |
| | | | 326/8 |
| 2017/0063559 A1* | 3/2017 | Wallrabenstein | H04L 9/3066 |
| 2017/0295026 A1* | 10/2017 | Guilley | G09C 1/00 |
| 2019/0026724 A1* | 1/2019 | Wade | G06Q 20/3278 |
| 2019/0028282 A1* | 1/2019 | Sharifi | G06Q 20/3823 |
| 2019/0130103 A1* | 5/2019 | Shen | G06F 21/73 |
| 2019/0158299 A1* | 5/2019 | Poo | H04L 9/3278 |

OTHER PUBLICATIONS

Lohrke, Heiko, et al.; "No Place to Hide: Contactless Probing of Secret Data on FPGAs," Cryptology ePrint Archive, Report 2016/593, 2016; Internet: https://eprint.iacr.org/2016/593.
Tajik, Shahin, et al., "Laser Fault Attack on Physically Unclonable Functions," 2015 Workshop on Fault Diagnosis and Tolerance in Cryptography (FDTC); DOI: 10.1109/FDTC.2015.19; IEEE Conference Sep. 13, 2015; pp. 85-96.

* cited by examiner

Primary Examiner — Christopher A Revak

(57) ABSTRACT

A physically unclonable function (PUF) system is provided. The PUF system includes an entropy source, a plurality of selectable paths, a random selection block, and error correction logic. The plurality of selectable paths are formed between the entropy source and an output for providing a PUF response. The random selection block is for randomly selecting one of the plurality of selectable paths in response to receiving a challenge. The error correction logic is coupled to the output for receiving the PUF response and for correcting any errors in the PUF response for the plurality of selectable paths. By using a different path through the entropy source each time a challenge is received, protection is provided against side-channel attacks.

20 Claims, 2 Drawing Sheets

PHYSICALLY UNCLONABLE FUNCTION RESISTANT TO SIDE-CHANNEL ATTACK AND METHOD THEREFOR

CROSS-REFERENCE TO RELATED APPLICATIONS

This application claims the priority under 35 U.S.C. § 119 of China application no. 201810304038.6, filed on 30 Mar. 2018, the contents of which are incorporated by reference herein.

BACKGROUND

Field

This disclosure relates generally to security, and more particularly, to a physically unclonable function (PUF) resistant to side-channel attack and method therefor.

Related Art

A physically unclonable function (PUF) is a physical system that will produce an unpredictable response when a stimulus is input. An example PUF uses a static random access memory (SRAM) as an entropy source. SRAM cells are bi-stable, meaning they only have two stable states. When powered up, the bi-stable SRAM cell will settle in one of the two stable states. Because a conventional SRAM is normally laid out to be symmetrical, the state it will be in when powered-up is unpredictable. However, manufacturing variations, temperature, power supply, switching noise, device aging, and other factors may cause some of the cells of the PUF to power-up in different states at different times. Because of this randomness, no two integrated circuits are exactly alike and so the output of the PUF is difficult to predict, and therefore difficult to recreate. This makes the PUF useful for storing unique information about the IC. For example, the PUF may be used to generate a digital signature or encryption/decryption key.

FIG. 1 illustrates, in block diagram form, PUF system 10 in accordance with the prior art. PUF system 10 includes PUF entropy source 12, error correction logic 14, and redundant bit memory 16. An output of PUF system 10 is connected to another block such as cryptographic algorithm 18. PUF entropy source 12 has an m-bit input labeled "Challenge" and an n-bit output labeled "Raw Response". The Raw Response may not be exactly the same each time it is output because of, for example, temperature and process changes. The redundant bits and error correction logic 14 may be used to provide a Corrected Response. During operation, the Corrected Response may be required multiple times, so the challenge-response may have to be repeated multiple times. Each time the challenge is received, the same circuits will be active to provide the Raw Response and then the Corrected Response. As discussed above, the unpredictable nature of a PUF makes it difficult to predict the response. However, using various side-channel attacks, such as optical emissions or power analysis, an attacker may be able to learn the PUF response and gain access to protected information.

Therefore, a need exists for a PUF system that is more resistant to side-channel attacks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
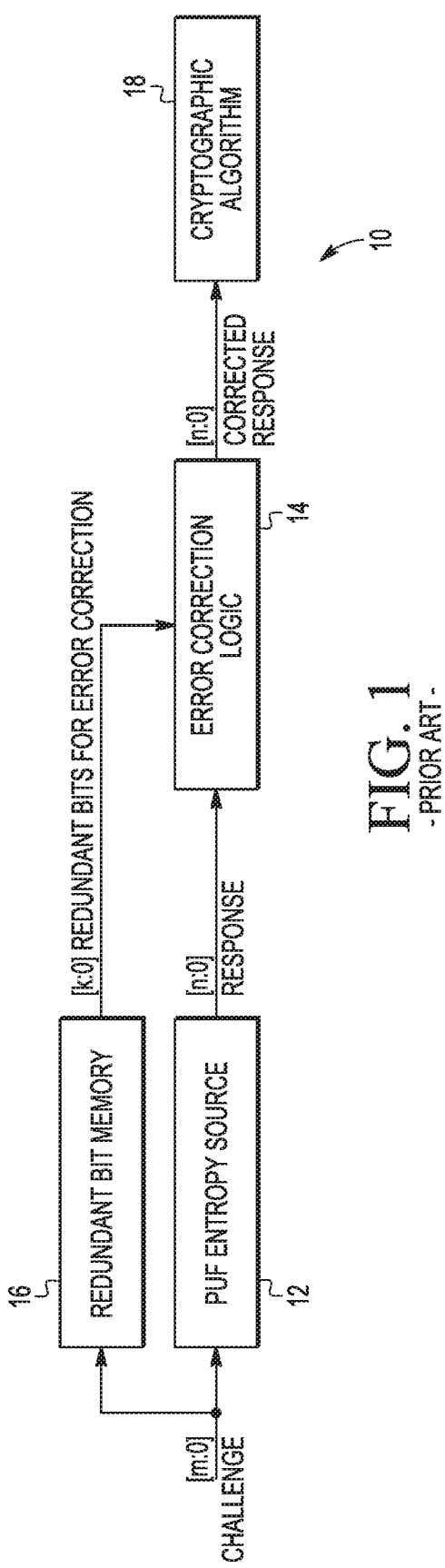
FIG. 1 illustrates, in block diagram form, a PUF system in accordance with the prior art.

Generally, there is provided, a PUF system having several selectable paths between an entropy source and an output. An externally generated challenge selects one of several different internal challenges. Each time the same external challenge is received, a different internal challenge is provided. The internal challenges randomly select one of the several selectable paths. Each selectable path, when selected, will provide the same corrected response. The raw responses from the several paths are similar but may have differences. In one embodiment, error correction code is used to correct minor errors in the PUF response caused by differences in the paths. Redundant bits may also be used with the error correction code to eliminate differences between the raw responses. The entropy source can be a conventional PUF, such as one or more static random access memory (SRAM) cells, a delay PUF, an optical PUF, an FPGA based PUF, a magnetic PUF, etc. The use of the several randomly selectable paths for the PUF response adds protection against side-channel attacks such as optical emission observation, laser probing, leakage current, power consumption differences, etc.

In one embodiment, there is provided, A physically unclonable function (PUF) system including: an entropy source; a plurality of selectable paths between the entropy source and an output for providing a PUF response; a selector for randomly selecting one of the plurality of selectable paths in response to receiving a challenge; and error correction logic coupled to the output for receiving the PUF response and for correcting any errors or differences in the PUF response for the plurality of selectable paths. The challenge may be randomly selected, and the challenge may be used to select one of a plurality of internal challenges, wherein the selected one of the plurality of internal challenges corresponds to one of the plurality of selectable paths. A different one of the randomly selected one of the plurality of internal challenges may be selected each time the challenge is received. The error correction logic may ensure the corrected PUF response is the same for each of the plurality of selected paths. The PUF system may further include a plurality of redundant bits, wherein the error correction logic selects one or more bits in the plurality of redundant bits for substituting for incorrect bits in the PUF response. The PUF system may be implemented on an integrated circuit. The PUF response may be used to generate a cryptographic key.

In another embodiment, there is provided, a method for providing a physically unclonable function (PUF) response, the method including: providing a first challenge to an entropy source in a PUF system, in response, the entropy source providing a raw PUF response; selecting one path from a plurality of paths in the PUF system, each of the plurality of paths extending from the entropy source to error correction logic of the PUF system; providing the raw PUF response to the error correction logic via the one selected path; error correcting the raw PUF response to produce a corrected PUF response; and using the corrected PUF response in a cryptographic algorithm. The first challenge may be randomly selected from a plurality of challenges. The first challenge may be randomly selected in response to receiving a second challenge, the second challenge provided from a source external to the PUF system. The method may further include substituting redundant bits for erroneous bits of the raw PUF response. The raw PUF response from each of the plurality of paths may be error corrected using the error correction logic to be the same corrected PUF response for any raw PUF response. A challenge map may be used in the PUF system for mapping the second challenge to one of a plurality of first challenges. Using the corrected PUF response in a cryptographic algorithm may further include using the corrected PUF response to generate a cryptographic key.

In yet another embodiment, there is provided, a physically unclonable function (PUF) system including: an entropy source; a plurality of selectable paths coupled to the entropy source; an external to internal challenge map for receiving an external challenge and for mapping the external challenge to one of a plurality of internal challenges, the external challenge received by the PUF system from a source external to the PUF system; a selector for randomly selecting one of the plurality of selectable paths in response to receiving an internal challenge from the challenge map; and error correction logic for correcting any errors in the PUF response for the plurality of selectable paths. The internal challenge may be randomly selected from a plurality of internal challenges, wherein the selected one of the plurality of internal challenges corresponds to one of the plurality of selectable paths. A different one of the randomly selected one of the plurality of internal challenges may be selected each time the external challenge is received. The error correction logic may ensure the corrected PUF response is the same for each of the plurality of selected paths. The PUF system may further include a plurality of redundant bits, wherein the error correction logic selects one or more bits in the plurality of redundant bits for substituting for incorrect bits in the PUF response. The PUF response may be used in a cryptographic algorithm.

Figure 2:
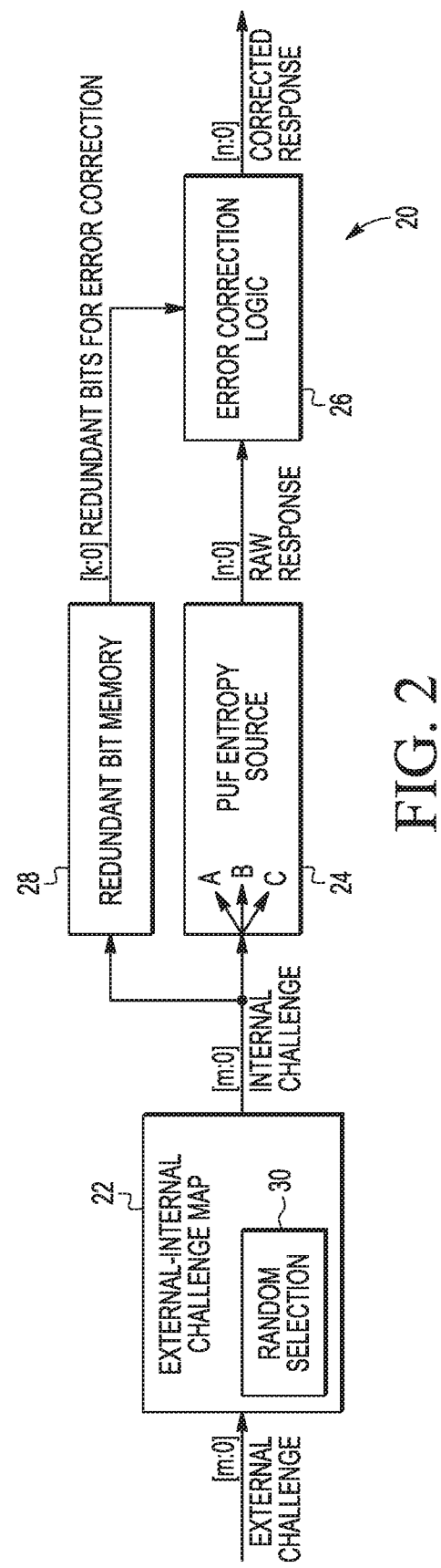
FIG. 2 illustrates, in block diagram form, a PUF system in accordance with an embodiment.

FIG. 2 illustrates, in block diagram form, PUF system 20 in accordance with an embodiment. PUF system 20 includes external-internal challenge map 22, PUF entropy source 24, error correction logic 26, and redundant bit memory 28. Challenge map 22 includes random selection block 30. Random selection block 30 may include a random number generator and a selection circuit for selecting an Internal Challenge. PUF system 20 uses challenge-response authentication. Challenge map 22 has an input for receiving an m-bit input labeled "External Challenge", and an output for providing a m-bit internal challenge. Each time an External Challenge is received, a different Internal Challenge is provided to PUF entropy source 24. Challenge map 22 may be implemented using, for example, a lookup table. PUF entropy source 24 has an m-bit input labeled "Internal Challenge" and an n-bit output labeled "Raw Response". The n-bit Raw Response is provided to an input of error correction logic 26. In response, error correction logic provides an n-bit Corrected Response. An output of PUF system 20 may be connected to another block such as the cryptographic algorithm 18 illustrated in FIG. 1. In one embodiment, the cryptographic algorithm is used to produce a cryptographic key used for encryption and decryption. In another embodiment, the cryptographic algorithm may be used to produce a digital signature. The variables m and n represent integers and may be the same or different in different embodiments. In another embodiment, the External Challenge has bit field [m:0] and the internal challenge has bit field [m':0], where m' is greater than m. Likewise, the Raw Response has bit field [n:0] and the Corrected Response is bit field [n':0], where n' is greater than n. In this case, the mapping is from a smaller number of bits to a larger number of bits, thus allowing any number of internal paths to make an attack more difficult. A bit selector or compression method may be used to convert the n-bit Raw Response to the n'-bit Corrected Response.

The n-bit Internal Challenge is also provided to redundant bit memory 28, and in response, k-bit redundant bits are provided to error correction logic 26 for use in error correcting the Raw Responses received from PUF entropy source 24. PUF entropy source 24 may include any type of entropy source for providing the n-bit Raw Response. For example, PUF entropy source 24 may include one or more SRAM cells, a delay PUF that uses delays in conductors, an optical PUF, an FPGA based PUF, a magnetic PUF, etc. On receipt of the External Challenge, external-internal challenge map 22 will use random selection block 30 to randomly select one of a plurality of corresponding Internal Challenges. Each time an External Challenge is received, a different Internal Challenge is selected to be provided to entropy source 24. Each of the Internal Challenges selects a different path through the circuitry and logic of PUF entropy source 24 as indicated by the arrows labeled "A", "B", and "C" while PUF entropy source 24 still provides the same or similar Raw Response. The different paths in PUF entropy source 24 may have different logic circuits connected together in different ways. Each time an External Challenge is received, a different path is chosen through entropy source 24. The use of different paths with different logic is intended to obstruct or hamper an attacker's use of side-channel attacks to gain access to the PUF.

Figure 3:
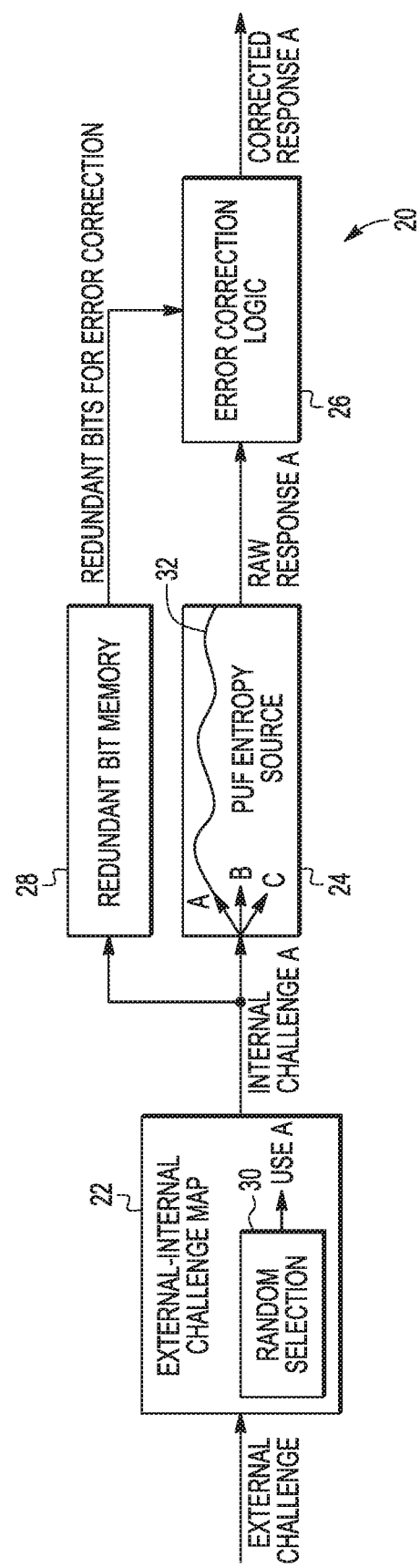
FIG. 3 illustrates an example of the operation of the PUF system in the embodiment of FIG. 2.

FIG. 3 illustrates an example of the operation of PUF system 20 in the embodiment of FIG. 2. An External Challenge is provided to External-Internal Challenge Map 22. Random selection block 30 selects or generates one of a plurality of Internal Challenges. For example, random selection block 30 may select an Internal Challenge A. Internal Challenge A is provided to PUF entropy source 24, where the path labeled A corresponds to Internal Challenge A. PUF entropy source 24 produces an n-bit Raw Response and provides the Raw Response to the input of error correction logic 26 via a path 32. The Raw Response may require error correction because of bit differences or errors. Error correction logic 26 uses redundant bits from redundant bits memory 28 to produce a corrected PUF response. In addition to error correction, error correction logic 26 will remove differences in the raw response from the different paths through entropy source 24. The corrected PUF response may be used in a security application, such as for example, a cryptographic algorithm. Each time the External Challenge is received, a different Internal Challenge and different path through PUF entropy source 24 are used.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A physically unclonable function (PUF) system comprising:
    an entropy source;
    a plurality of selectable paths between the entropy source and an output for providing a PUF response;
    a selector for randomly selecting one path of the plurality of selectable paths in response to receiving a challenge; and
    error correction logic coupled to the output for receiving the PUF response and for correcting any errors or differences in the PUF response for the plurality of selectable paths.

2. The PUF system of claim 1, wherein the challenge is randomly selected, and the challenge is used to select one of a plurality of internal challenges, wherein the selected one of the plurality of internal challenges corresponds to one of the plurality of selectable paths.

3. The PUF system of claim 2, wherein a different one of the randomly selected one of the plurality of internal challenges is selected each time the challenge is received.

4. The PUF system of claim 1, wherein the error correction logic ensures the corrected PUF response is the same for each of the plurality of selected paths.

5. The PUF system of claim 1, further comprising a plurality of redundant bits, wherein the error correction logic selects one or more bits in the plurality of redundant bits for substituting for incorrect bits in the PUF response.

6. The PUF system of claim 1, wherein the PUF system is implemented on an integrated circuit.

7. The PUF system of claim 1, wherein the PUF response is used to generate a cryptographic key.

8. A method for providing a physically unclonable function (PUF) response, the method comprising:
    providing a first challenge to an entropy source in a PUF system, in response, the entropy source providing a raw PUF response;
    randomly selecting one path from a plurality of paths in the PUF system, each of the plurality of paths extending from the entropy source to error correction logic of the PUF system;
    providing the raw PUF response to the error correction logic via the one selected path; error correcting the raw PUF response to produce a corrected PUF response; and
    using the corrected PUF response in a cryptographic algorithm.

9. The method of claim 8, wherein the raw PUF response from each of the plurality of paths is error corrected using the error correction logic to be the same corrected PUF response for any raw PUF response.

10. The method of claim 8, wherein the first challenge is randomly selected from a plurality of challenges.

11. The method of claim 10, wherein the first challenge is randomly selected in response to receiving a second challenge, the second challenge provided from a source external to the PUF system.

12. The method of claim 8, further comprising substituting redundant bits for erroneous bits of the raw PUF response.

13. The method of claim 8, wherein a challenge map is used in the PUF system for mapping the second challenge to one of a plurality of first challenges.

14. A physically unclonable function (PUF) system comprising:
    an entropy source;
    a plurality of selectable paths coupled to the entropy source;
    an external to internal challenge map for receiving an external challenge and for mapping the external challenge to one of a plurality of internal challenges, the external challenge received by the PUF system from a source external to the PUF system;
    a selector for randomly selecting one of the plurality of selectable paths in response to receiving an internal challenge from the challenge map; and
    error correction logic for correcting any errors in the PUF response for the plurality of selectable paths.

15. The method of claim 8, wherein using the corrected PUF response in a cryptographic algorithm further comprises using the corrected PUF response to generate a cryptographic key.

16. The PUF system of claim 14, wherein the internal challenge is randomly selected from a plurality of internal challenges, wherein the selected one of the plurality of internal challenges corresponds to one of the plurality of selectable paths.

17. The PUF system of claim 16, wherein a different one of the randomly selected one of the plurality of internal challenges is selected each time the external challenge is received.

18. The PUF system of claim 14, wherein the error correction logic ensures the corrected PUF response is the same for each of the plurality of selected paths.

19. The PUF system of claim 14, further comprising a plurality of redundant bits, wherein the error correction logic selects one or more bits in the plurality of redundant bits for substituting for incorrect bits in the PUF response.

20. The PUF system of claim 14, wherein the PUF response is used in a cryptographic algorithm.

* * * * *